June 1, 1965  TANEKATSU TORII  3,186,778
BEARING ASSEMBLIES
Filed Jan. 23, 1963
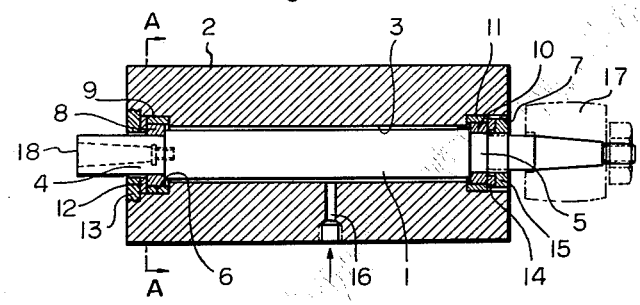
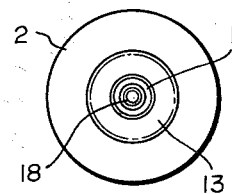 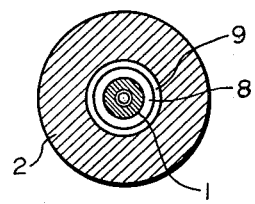
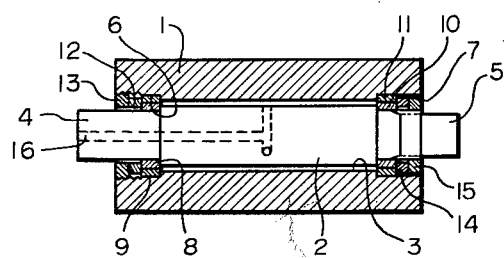
Inventor
Tanekatsu Torii
By Stevens, Davis, Miller & Mosher
Attorneys United States Patent Office 3,186,778
Patented June 1, 1965

3,186,778
BEARING ASSEMBLIES
Tanekatsu Torii, 4 Toriyagane, Minowacho, Anjo-shi,
Aichi-ken, Japan
Filed Jan. 23, 1963, Ser. No. 253,387
Claims priority, application Japan, Apr. 16, 1962,
37/15,575
1 Claim. (Cl. 308—121)

The present invention relates to plain bearing assemblies. Conventional bearings are divided into rolling-contact bearings including balls or rollers and plain bearings including a combined use of a harder and softer metal. The two types of bearings have respective advantages and are usable for respective applications. Conventional bearings, however, have involved various difficulties from the viewpoints of high-speed rotation, high accuracy, long-period maintenance of precision, acid- and alkali-resistance, heat resistance, lubrication and others, and thus it has been difficult to maintain the bearing characteristics for any extended service period. This has formed an important problem to the industry, and among others, improper lubrication has frequently given rise to trouble in operation.

The present invention is intended to solve the above problem and has for its object to provide an improved bearing assembly particularly adapted to maintain its accuracy in high-speed operation for an extended period of time, reduced in production cost compared to that of conventional high-speed bearings, and suitable for applications where corrosion, high temperature, inaccessibility for lubrication or other difficulty is involved.

The present invention is based upon a discovery, made through various investigations conducted to attain the above objective, that super-hard alloys have advantageous characteristics as bearing materials. The term "super-hard alloy" as referred to herein means a sintered alloy containing tungsten carbide (WC) as a base, titanium carbide (TiC), tantalum carbide (TaC), and cobalt or other iron group metal as a binder and produced by the use of powder metallurgy.

According to the present invention, a bearing assembly comprises a bearing element secured to a rotative member and another bearing element secured to a member for rotatably supporting said rotative member, said bearing elements being formed of super-hard alloy and arranged in sliding engagement with each other.

The foregoing and other objects and advantages of the invention will become apparent from the following description when taken with reference to the accompanying drawings, which illustrate a few embodiments of the invention and in which:

FIG. 1 is a longitudinal cross-sectional view of one embodiment of the invention;

FIG. 2 is a side elevational view of the same;

FIG. 3 is a cross-sectional view taken along the line A—A in FIG. 1;

FIG. 4 is a longitudinal cross-sectional view of another embodiment of the invention with its rotary member arranged outside.

Super-hard alloys are used in cutting tools and dies having an extreme hardness and an excellent wear resistance, as is well known in the art. Tungsten monocarbide has a very high melting point of 2900° C. and has a structure insusceptible to heat up to the melting point, 1467° C., of the cobalt as a binder or the vicinity thereof.

Super-hard alloys also have a hardness variable with the temperature only to a limited extent as compared to that of other alloys and bearing metals. It has been observed, the super-hard alloys (WC+Co, WC+TiC+Co) have a hardness of Rockwell A 85 or over at room temperature, which is very high compared with that of other alloys. The hardness is slowly reduced with rise in temperature only at a rate much lower than other alloys, and is as high as Rockwell A 60 or over even at 1000° C.

Moreover, the thermal coefficients of expansion of super-hard alloys are in the range of 5 to 6×10$^{-6}$, which means that they are subject only to a very limited thermal expansion or contraction. The high hardness of the material apparently offers an advantage that highly accurate products can be obtained by finish machining. The bearing assembly for high-speed operation utilizing the above-mentioned characteristic properties of super-hard alloys can support heavy loads with a bearing surface of limited area.

A few embodiments of the invention will now be described in detail with reference to the accompanying drawings.

*Example 1*

FIG. 1 illustrates a high-speed precision bearing assembly including a hollow stationary member 2 and a rotative shaft 1 loosely fitted in an axial bore 3 formed therein. The rotative shaft 1 is reduced in diameter at opposite ends as indicated at 4 and 5 to form shoulders. The stationary or fixed member 2 is counterbored at opposite open ends of the axial bore 3 to define shouldered bearing-mounting cavities 6 and 7 for receiving respective reduced-diameter shaft portions 4 and 5. Inner annular bearing elements or rings 8 and 10 formed of a super-hard alloy are closely fitted over the respective reduced-diameter shaft portions 4 and 5 against the shoulders thereof and fixed in place by brazing. Outer annular bearing elements or rings 9 and 11 are closely fitted in said respective bearing-mounting cavities 6 and 7 against the shoulders thereof and fixed in place by brazing so as to slidably fit over said respective inner rings 8 and 10 thus to form plain journal or radial bearings at opposite ends of the axial bore 3 formed in the stationary member 2. The left-hand bearing mounting cavity 6 is threaded around the periphery adjacent to its open end for threadable engagement with a threaded adjusting ring 13 loosely fitted over the reduced-diameter portion 4 of the rotative shaft 1. A thrust ring 12 of super-hard alloy is brazed to the adjusting ring 13 and is held in sliding engagement with the outer end face of the inner bearing element 8 integral with the reduced-diameter shaft portion 4 thus to form a plain thrust bearing. The right-hand reduced-diameter shaft portion 5 is screw-threaded about its periphery to threadably receive a threaded adjusting ring 15 loosely fitted in the open end of the right-hand bearing-mounting cavity 7. A thrust ring 14 of super-hard alloy is brazed to the inner end face of said adjusting ring 15 and is held in sliding engagement with the outer end face of the outer bearing element 11 fixedly fitted in the bearing-mounting cavity 7 thus to form another plain thrust bearing. It is to be understood that the adjusting rings 13 and 15 are each threaded so as to be tightened with rotation of the shaft 1. The medial full-diameter portion of the rotative shaft 1 as supported by the opposite plain radial bearings is radially slightly spaced from the wall of the axial bore 3 and an oil-air mixture from an oil mist not shown is fed through a transverse oil passage 16 formed in the stationary member into the radial space between the medial shaft portion and the axial bore therein and further to the respective bearings at opposite ends of the assembly for lubrication of the sliding surfaces of the bearings thereon as well as for air-cooling the bearings. Reference numeral 17 indicates a pulley mounted on the right-hand end of the rotative shaft 1; and 18 a joint formation for receiving a spindle.

FIG. 4 illustrates another form of bearing assembly according to the present invention including a stationary shaft or bearing member 2 and a hollow rotative member 1 fitted over the stationary shaft 2. The embodiment is principally identical with one shown in FIG. 1, the sole difference over the latter being the outside arrangement of the rotary member as contrary to the inside arrangement in the latter. Further detailed description will therefore be made with this embodiment, like reference characters indicating like parts in FIGS. 1 and 4.

Test results will next be explained which were obtained with an internal grinder head incorporating the embodiment shown in FIG. 1 with the inner rings 8 and 10 formed with a super-hard alloy containing 89% WC and 11% Co and the outer rings 9 and 11 formed with a super-hard alloy containing 88% WC, 5% TiC and 8% Co.

Tests were conducted at a speed of 38,000 r.p.m. with no lubrication or water, the temperature first rose rapidly for about two hours and then at a rate decreasing slowly to reach approximately 500% C. after six hours.

It is noted from this experiment that it is more effective to use water as a cooling medium than to use a lubricant. At the end of this experiment, the wear of bearing elements as measured with a micrometer of an accuracy of ±0.001 mm. was negligible, no binding of elements due to heat occurred even when no lubrication was employed.

In case the grinder head was run at about 20,000 r.p.m. without lubrication for seven consecutive days for 7 hours a day, the highest temperature reached was 660° C. and no roughening of the sliding surfaces was noticed.

It is recognized with the bearing assembly that the sliding metal elements being formed of an alloy of extreme hardness are free from any surface deformation and thus smoothly slidable over each other. In addition, they are free from binding otherwise possible due to heat since the materials for the respective elements have no tendency to fuse to each other. Moreover, the elements are highly wear-resistant and not subject to any substantial thermal deformation. By virtue of these characteristics, the bearing assembly of the invention is particularly suitable for use with high-speed rotative shafts and can maintain its high accuracy for such an extended period of service that its durability can hardly be imagined as no wear was experienced in actual use up to the present. The bearing assembly is also advantageous in that it is simple in construction and less expensive to manufacture than conventional super-precision grade rolling contact bearings. Thus, it is particularly suitable not only for use as a spindle bearing or other rotary shaft bearing in general high-speed machine tools, but also for use in precision machine tools and also in watches and cameras.

Description will next be made of another practical use of the bearing assembly of the invention. In the following example, the bearing assembly is fitted in the wall of an electric furnace for supporting the shaft of a fan used therein.

Any type of conventional bearings has required lubrication and it has been impossible to use it with any success at a temperature range exceeding 220% C. even with lubrication. Accordingly, in the past, the shaft of any fan used in an electric furnace has not been journaled in the roof wall of the furnace but journaled exteriorly thereof so that the distance of the fan itself and the bearing for the shaft thereof has been substantial involving difficulties such as severe vibration of the fan shaft, bearing trouble and increase in the motor load. These difficulties have been overcome by the present invention.

The bearing assembly of the present invention is advantageous in that even at elevated temperatures the decrease in hardness of the bearing elements is limited, there is no danger of the elements binding due to heat, and the elements have a high flexural strength. Accordingly, the bearing assembly is not only suited for use as a wall-mounted bearing to be mounted in the roof wall of an electric furnace for supporting the shaft of a fan used therein, but also is utilizable with rotative parts of hardening and other heat-treating furnaces which are difficult to lubricate, roll shafts of hot-rolling and other iron and steel mill units, cross pins and crankshafts of engines, turbine shafts, etc.

The fact that super-hard alloys have a substantial resistance to sea water as well as to pure water has been demonstrated by experiments.

Experiments were conducted during which the temperature of the bearing assembly immersed in the sea water in the tank remained at a level slightly higher than that of the sea water. No wear was noticed even after 150 hours run.

It will be recognized from the above results that the bearing assembly of the invention is also suitable for use as a stern bearing for a marine propeller shaft.

Formed of super-hard alloys, which are highly resistant to chemicals, the bearing assembly of the invention is also suited for use in chemical machines. Further, it is suited for use in washing machines, electric fans, home well pumps and other home machines and appliances which are often not fully attended for lubrication as it can be run without lubrication; for use in construction machines, belt conveyors, cultivators and other machines into which sand or muddy water is apt to intrude owing to its high hardness, limited wear, high flexural strength and resistance to water; and for use as an axle bearing in various vehicles including sports cars, which is subject to arduous conditions, under which conventional bearings have been readily damageable. In case the bearing assembly is used on a rotative shaft of substantial diameter, each of its inner and outer rings may be divided into a number of sections.

As apparent from the foregoing, the present invention is based upon an entirely novel conception of employing sliding elements formed of super-hard alloy, which notably has a high hardness, high melting point, high wear resistance and other characteristic properties, apart from the conventional design idea of employing sliding elements formed of a softer and a harder metal, respectively, and provides an improved bearing assembly having a high accuracy, which can be retained for an extended period of service, and efficiently usable in different applications.

Having shown and described herein a few embodiments of the invention, it is to be noted that it is not to be limited to the details set forth but may be varied in many ways within the scope of the invention as claimed.

What is claimed is:

A bearing assembly comprising a shaft member having coaxially reduced ends, an outer annular member, circumposed on and spaced radially from the shaft member, said shaft member and outer annular member being relatively rotatably mounted, first bearing rings circumposed on the inner portions of the coaxially reduced ends, second bearing rings surrounding the first bearing rings in sliding engagement therewith, said annular member having seats receiving said second bearing rings, said bearing rings being formed of super-hard alloy, thrust rings surrounding the ends of the shaft member and bearing against the bearing rings, adjustable adjusting members integral with the thrust rings, cooperative securing means between the outer member and the adjusting members, and means for introducing fluid into the space between the outer annular member and the shaft member.

References Cited by the Examiner

UNITED STATES PATENTS 2,453,182  11/48  Bechler _____ 308—161

FOREIGN PATENTS 196,710  5/23  Great Britain.
514,295  11/39  Great Britain.
888,834  2/62  Great Britain.

ROBERT C. RIORDON, *Primary Examiner.*

FRANK SUSKO, *Examiner.*